United States Patent
Kim

(10) Patent No.: US 9,741,261 B2
(45) Date of Patent: Aug. 22, 2017

(54) EDUCATIONAL TIMEPIECE

(71) Applicant: Tae-Hyun Kim, Seoul (KR)

(72) Inventor: Tae-Hyun Kim, Seoul (KR)

( * ) Notice: Subject to any disclaimer, the term of this patent is extended or adjusted under 35 U.S.C. 154(b) by 299 days.

(21) Appl. No.: 14/395,079

(22) PCT Filed: Mar. 26, 2013

(86) PCT No.: PCT/KR2013/002487
§ 371 (c)(1),
(2) Date: Oct. 17, 2014

(87) PCT Pub. No.: WO2013/157753
PCT Pub. Date: Oct. 24, 2013

(65) Prior Publication Data
US 2015/0072329 A1    Mar. 12, 2015

(30) Foreign Application Priority Data
Apr. 18, 2012    (KR) .......................... 10-2012-0040145

(51) Int. Cl.
*G09B 19/12*    (2006.01)
*G04B 19/06*    (2006.01)
*G09B 19/02*    (2006.01)

(52) U.S. Cl.
CPC ............. *G09B 19/12* (2013.01); *G04B 19/06* (2013.01); *G09B 19/02* (2013.01)

(58) Field of Classification Search
USPC .................................... 434/304; 368/17, 232
See application file for complete search history.

(56) References Cited

U.S. PATENT DOCUMENTS

| | | | | |
|---|---|---|---|---|
| 4,788,669 A | * | 11/1988 | Kamiyama | G04C 3/146 368/160 |
| 5,018,118 A | * | 5/1991 | Ross | G04B 19/02 368/223 |
| 2003/0099923 A1 | | 5/2003 | Pender | |
| 2011/0026370 A1 | * | 2/2011 | Ihashi | G04F 8/00 368/107 |

FOREIGN PATENT DOCUMENTS

| | | |
|---|---|---|
| JP | 2004-054171 A | 2/2004 |
| JP | 2006-189287 A | 7/2006 |
| JP | 313630 U9 | 10/2007 |
| KR | 10-0194757 B1 | 2/1999 |
| KR | 20090040160 A * | 4/2009 |

OTHER PUBLICATIONS

International Search Report for PCT/KR2013/002487 mailed Jul. 26, 2013 from Korean Intellectual Property Office.

* cited by examiner

*Primary Examiner* — James Hull
(74) *Attorney, Agent, or Firm* — Paratus Law Group, PLLC

(57) ABSTRACT

An educational timepiece provided with the hour hand and the minute hand, which comprises a base plate having an upper surface on which the hour hand and the minute hand rotate, and an angle hand rotating on the upper surface of the base plate for measuring the angle between the hour hand and the minute hand, wherein the angle hand serves to measure the angle between the hour hand and one of the hour indication parts adjacent to the hour hand, the interval between every two adjacent hour indication parts being divided by a given angle.

10 Claims, 8 Drawing Sheets

… … …

EDUCATIONAL TIMEPIECE

CROSS REFERENCE TO PRIOR APPLICATION

This application is a National Stage Patent Application of PCT International Patent Application No. PCT/KR2013/002487 (filed on Mar. 26, 2013) under 35 U.S.C. §371, which claims priority to Korean Patent Application No. 10-2012-0040145 (filed on Apr. 18, 2012), which are all hereby incorporated by reference in their entirety.

TECHNICAL FIELD

The present invention relates to an educational timepiece, and more particularly, to an educational timepiece that is capable of calculating an angle between an hour hand and a minute hand of the timepiece to obtain educational effects.

BACKGROUND ART

In elementary and secondary education courses, there are various educations using a timepiece such as a process of training a method for reading a time through an hour hand and a minute hand and a process of calculating an angle between the hour hand and the minute hand.

Here, to calculate the angle between the hour hand and the minute hand, a protractor may be used, or a timepiece including a self-protractor for showing an angle may be used. The above-described timepiece is disclosed in Korean Patent Registration No. 0194757.

However, in the case of the method for reading the angle between the hour hand and the minute hand by using the conventional protractor, the measurement of the angle between the hour hand the minute hand through the simple protractor may just pass to practice for it and thus be inferior to mathematical calculation of the angle between the hour hand and the minute hand.

For example, in the mathematical educations using a timepiece during the elementary and secondary education courses, education contents for mathematically calculating an angle between an hour hand and a minute hand at a specific time without using a separate protractor are being proposed in recent years.

Here, since the hour indication parts that respectively indicate fixed times on the timepiece have an angle of 30° therebetween, and the hour hand rotates by one hour between the hour indication parts, the angle between the hour hand and the minute hand may be calculated.

In the case of the mathematical problem solution using the timepiece, a teaching method that is capable of confirming whether the calculated value is correct through a separate teaching tool or is more easily approachable through a teaching tool is needed.

DISCLOSURE OF THE INVENTION

Technical Problem

To solve the above-described problems according to the related art, the present invention provides an educational timepiece that is capable of easily calculating an angle between an hour hand and a minute hand by using an angle hand that is separately provided with respect to the hour hand and the minute hand.

Another object of the prevent invention provides an educational timepiece in which various polygonal shapes are assembled to observe the polygonal shapes within the timepiece and confirm an internal angle between the polygonal shapes.

Technical Solution

According to the present invention to achieve the above-described objects, there is provided an educational timepiece including an hour hand and a minute hand to visually indicate an hour, the educational timepiece including: a base plate on which the hour hand and the minute hand rotate along a top surface thereof; and an angle hand rotating along the top surface of the base plate to measure an angle between the hour hand and the minute hand, wherein the angle hand is divided into predetermined angle units between hour indication parts that respectively indicate fixed hours to measure the angle between the hour hand and one of the hour indication parts that are adjacent to the hour hand.

Also, a plurality of unit parts for dividing the angle between the adjacent two hour indication parts of the hour indication parts that respectively indicate the fixed hours may be disposed on the angle hand, angle indication parts corresponding to the hour indication parts that respectively indicate the fixed hours may be disposed on a top surface of the base plate, and the angle indication parts may divide the base plate into 360 equal segments at an angle of 360° with respect to central centers of the hour hand and the minute hand to indicate respective angles.

Also, the angle indication parts may include: a first angle indication part increasing in angle of the hour indication part that indicates 12:00 with respect to 0° in a clockwise direction; and a second angle indication part increasing in angle of the hour indication part that indicates 12:00 with respect to 0° in a counterclockwise direction.

An auxiliary plate having a polygonal shape may be coupled to the top surface of the base plate to observe an angle between the hour indication parts or an internal angle between the angle indication parts, and the auxiliary plate may have a regular polygonal shape, and the minute hand has a circular arc shape that passes through adjacent two vertexes of the regular polygonal shape and the rotational center of the minute hand.

Also, a polygonal-shaped piece corresponding to the polygonal shape of the auxiliary plate may be disposed on at least one of the hour hand and the minute hand, and the angle hand may be disposed between the two hour indication parts that are adjacent to the hour hand to divide an angle between the two hour indication parts into predetermined angles and may rotate by a predetermined angle with respect to a fixed hour so that the angle hand is always disposed between the two hour indication parts that are adjacent to the hour hand.

Here, the angle hand may include: a central part; and a plurality of unit parts radially extending from the central part, the plurality of unit parts having a predetermined angle therebetween, and a central unit part of the plurality of unit parts disposed on the angle hand may have a relatively long length.

Here, the educational timepiece may include: a control unit disposed on a bottom surface of the base plate; a power source unit connected to the control unit to supply a power into the educational timepiece; a first motor unit and gear assembly which are connected to the control unit to rotate the hour hand and the minute hand by using the power supplied from the power source unit; and a second motor unit connected to the control unit to rotate the angle hand by using the power supplied from the power source unit.

Also, a driven gear part connected to the second motor unit may be disposed at a central portion of the angle hand, and the control unit may include a sensor unit to rotate the angle hand when the hour hand indicates the respective fixed hours.

The educational timepiece may further include: a control unit disposed on a bottom surface of the base plate; a power source unit connected to the control unit to supply a power into the educational timepiece; a first motor unit and gear assembly which are connected to the control unit to rotate the hour hand and the minute hand by using the power supplied from the power source unit; and a display unit connected to the control unit to display the angle hand on the base plate.

Advantageous Effects

As described above, the educational timepiece according to the present invention may expect following effects.

The present invention may enables students to easily calculate the angle between the hour hand and the minute hand, thereby promising the educational effect using the timepiece in addition to the original function of the timepiece.

Particularly, the educational timepiece may not simply represent the angle between the hour hand and the minute hand, but induces the learners to actively calculate the angle by using the angle hand, thereby resulting in more intelligent education.

Also, since the angle hand according to the present invention rotates at every fixed hour to move to a position corresponding to the hour hand, the angle hand may stay at only the desired positions to more easily utilize the angle hand, thereby causing learner's interest.

Also, since the auxiliary plate having the various polygonal shapes and the polygonal-shaped pieces are disposed on the educational timepiece, the various polygonal shapes may be observed on the educational timepiece. Thus, the internal angle may be calculated or compared to the angle between the hour hand and the minute hand to realize more various educational effects.

Particularly, since the auxiliary plate and the polygonal-shaped piece are selectively added, the user such as the educator or the learner may replace the auxiliary plate and the polygonal-shaped piece to realize more various educational contents.

BEST MODE FOR CARRYING OUT THE INVENTION

Figure 1:
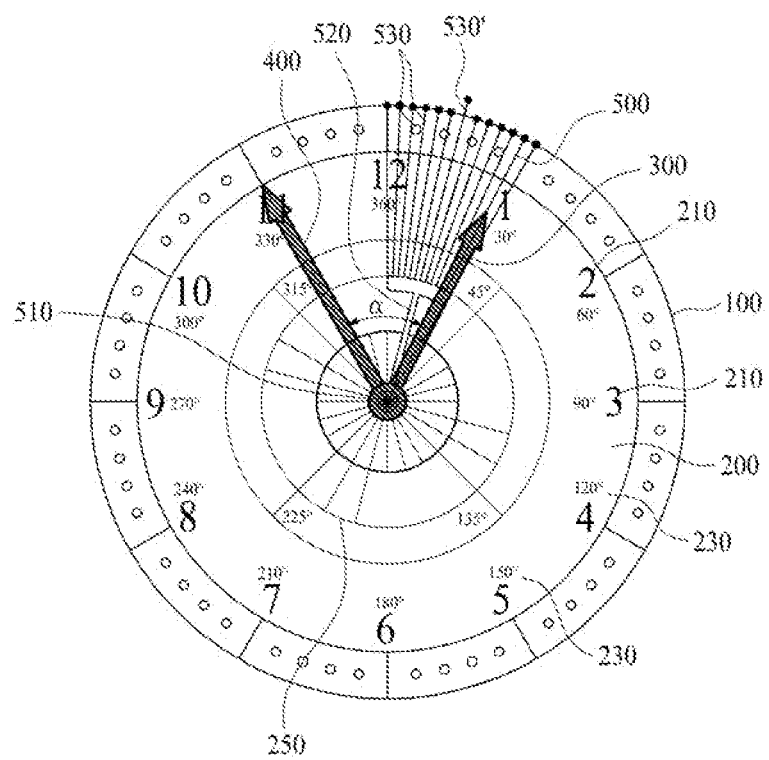
FIG. 1 is a plan view of an educational timepiece according to a preferable embodiment of the present invention.

The present invention relates to an educational timepiece including an hour hand and a minute hand to visually indicate an hour, the educational timepiece including a base plate on which the hour hand and the minute hand rotate along a top surface thereof, and an angle hand rotating along the top surface of the base plate to measure an angle between the hour hand and the minute hand, wherein the angle hand is divided into predetermined angle units between hour indication parts that respectively indicate fixed hours to measure the angle between the hour hand and one of the hour indication parts that are adjacent to the hour hand.

Also, a plurality of unit parts for dividing the angle between the adjacent two hour indication parts of the hour indication parts that respectively indicate the fixed hours may be disposed on the angle hand, angle indication parts corresponding to the hour indication parts that respectively indicate the fixed hours may be disposed on a top surface of the base plate, and the angle indication parts may divide the base plate into 360 equal segments at an angle of 360° with respect to central centers of the hour hand and the minute hand to indicate respective angles.

Also, the angle indication parts may include a first angle indication part increasing in angle of the hour indication part that indicates 12:00 with respect to 0° in a clockwise direction and a second angle indication part increasing in angle of the hour indication part that indicates 12:00 with respect to 0° in a counterclockwise direction.

An auxiliary plate having a polygonal shape may be coupled to the top surface of the base plate to observe an angle between the hour indication parts or an internal angle between the angle indication parts, and the auxiliary plate may have a regular polygonal shape, and the minute hand has a circular arc shape that passes through adjacent two vertexes of the regular polygonal shape and the rotational center of the minute hand.

Also, a polygonal-shaped piece corresponding to the polygonal shape of the auxiliary plate may be disposed on at least one of the hour hand and the minute hand, and the angle hand may be disposed between the two hour indication parts that are adjacent to the hour hand to divide an angle between the two hour indication parts into predetermined angles and may rotate by a predetermined angle with respect to a fixed hour so that the angle hand is always disposed between the two hour indication parts that are adjacent to the hour hand.

Here, the angle hand may include a central part and a plurality of unit parts radially extending from the central part, the plurality of unit parts having a predetermined angle therebetween, and a central unit part of the plurality of unit parts disposed on the angle hand may have a relatively long length.

Here, the educational timepiece may include a control unit disposed on a bottom surface of the base plate, a power source unit connected to the control unit to supply a power into the educational timepiece, a first motor unit and gear assembly which are connected to the control unit to rotate the hour hand and the minute hand by using the power supplied from the power source unit, and a second motor unit connected to the control unit to rotate the angle hand by using the power supplied from the power source unit.

Also, a driven gear part connected to the second motor unit may be disposed at a central portion of the angle hand, and the control unit may include a sensor unit to rotate the angle hand when the hour hand indicates the respective fixed hours.

The educational timepiece may further include a control unit disposed on a bottom surface of the base plate, a power source unit connected to the control unit to supply a power into the educational timepiece, a first motor unit and gear assembly which are connected to the control unit to rotate the hour hand and the minute hand by using the power supplied from the power source unit, and a display unit connected to the control unit to display the angle hand on the base plate.

MODE FOR CARRYING OUT THE INVENTION

Hereinafter, an educational timepiece according to specific embodiments of the present invention will be described in detail with reference to the accompanying drawings.

Figure 2:
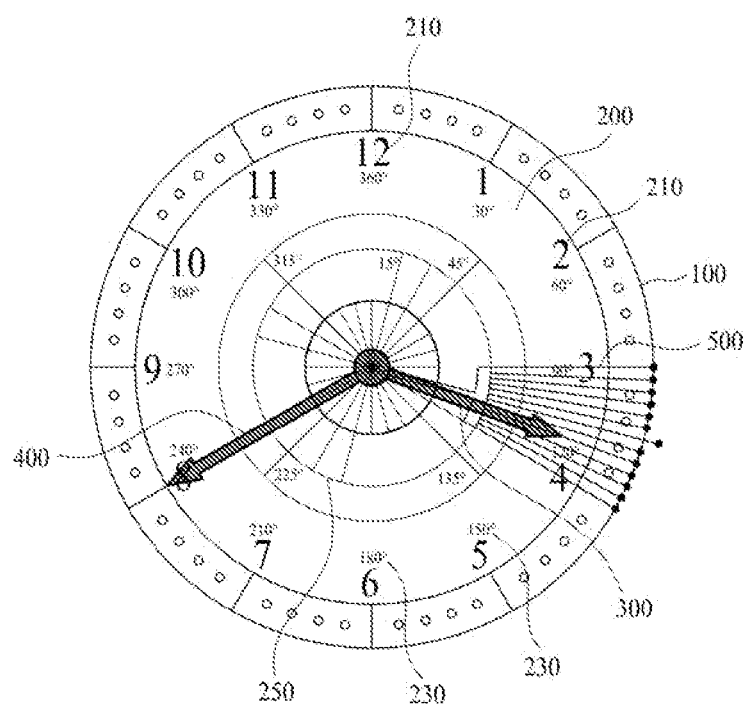
FIG. 2 is a plan view of a base plate according to an embodiment of the present invention.

FIG. 1 is a plan view of an educational timepiece according to a preferable embodiment of the present invention, and FIG. 2 is a plan view of a base plate according to an embodiment of the present invention.

As illustrated in the drawings, an educational timepiece according to the present invention includes a base plate 100 and an angle hand 500. Also, the base plate 100 may be coupled to a control unit 10 and a power source unit 20, which drive the timepiece. This will be described below in detail.

First, explaining the base plate 100, the base plate 100 may have a thin plate shape. Also, various figures or characters may be displayed on the base plate 100 to indicate hours or angles. Although the base plate 100 has a circular plate shape in the present embodiment, the present invention is not limited thereto. For example, the base plate 100 may have a polygonal shape.

Here, a separate indication plate 200 may be disposed on the base plate 100. The hours or angles may be substantially indicated on an outer surface of the indication plate 200 so that the indication plate 200 indicate a hour or angle at a time point that is indicated by an hour hand 300 or a minute hand 400. The indication plate 100 may be integrated with the base plate 100 or replaced with a separate object.

Hour indication parts 210 for indicating the hour and angle indication parts 230 for indicating the angle are disposed on a top surface of the indication plate 200. The hour indication parts 210 and the angle indication parts 230 may be disposed along an edge of the outer surface of the indication plate 200 and be spaced a predetermined distance from each other.

The hour indication parts 210 may indicate the hours. The hour indication parts 210 may be constituted by specific figures, for example, the integers from one to twelve that are disposed in a clockwise direction, like the general timepiece.

The angle indication parts 230 may be disposed inside the hour indication parts 210. The angle indication parts 230 may divide the indication plate 200 into 360 equal segments at an angle of 360° along an edge of the indication plate 200. Here, the angles may be indicated in various manners. As illustrated in FIG. 1, each of the angle indication parts 230 may be disposed at an angle of 30° at a position that is adjacent to each of the hour indication parts 210.

Furthermore, as illustrated in FIG. 1, specific angles such as angles of 45°, 135°, and the like may be separately indicated inside the angle indication parts. Of cause, more detailed gradations may be additionally indicated between the specific angles.

The indication plate 200 on which the angle indication parts 230 are indicated may be well illustrated in FIG. 2. As illustrated in FIG. 2, the angle indication parts 230 may be disposed at an angle of 30° along a full circle of 360° in a clockwise direction (first angle indication parts A) and also be further disposed inside the first angle indication parts A at an angle of 30° in a counterclockwise direction (second angle indication parts B). As described above, since the angles are indicated in the directions opposite to each other, an angle between the hour hand 300 and the minute hand 400 may be measured in the clockwise direction and the counterclockwise direction.

Referring again to FIG. 1, the hour hand 300 and the minute hand 400 are disposed on the top surface of the indication plate 200. The hour hand 300 and the minute hand 400 indicate an hour while rotating at an angle of 360° with respect to a rotational center thereof. For example, in FIG. 1, the hour hand 300 and the minute hand 400 indicate 12:55.

The angle hand 500 is disposed on the indication plate 200. The angle hand 500 may easily indicate an angle between the hour hand 300 and the minute hand 400. The angle hand 500 may rotate along the top surface of the indication plate 200.

More particularly, the angle hand 500 may divide an angle between the hour indication parts that indicate fixed hours into given angles to assist the measurement of the angle (see reference symbol a of FIG. 1) between the hour hand 300 and the hour indication part 210 that indicates a fixed hour and is disposed adjacent to the hour hand 300.

Referring to FIG. 1, the angle hand 500 may be disposed between 12:00 and 1:00 to measure an angle between a point that is indicated by the hour hand 300 and 12:00. That is, the angle hand 500 may be disposed between the hour indication parts 210 adjacent to each other to fragment an angle between the hour indication parts 210 into given angles, thereby measuring the angle from a position of the hour hand 300 (one point) to the hour indication part 210 (two points) that indicates a fixed hours and is adjacent to the hour hand 300.

Figure 6:
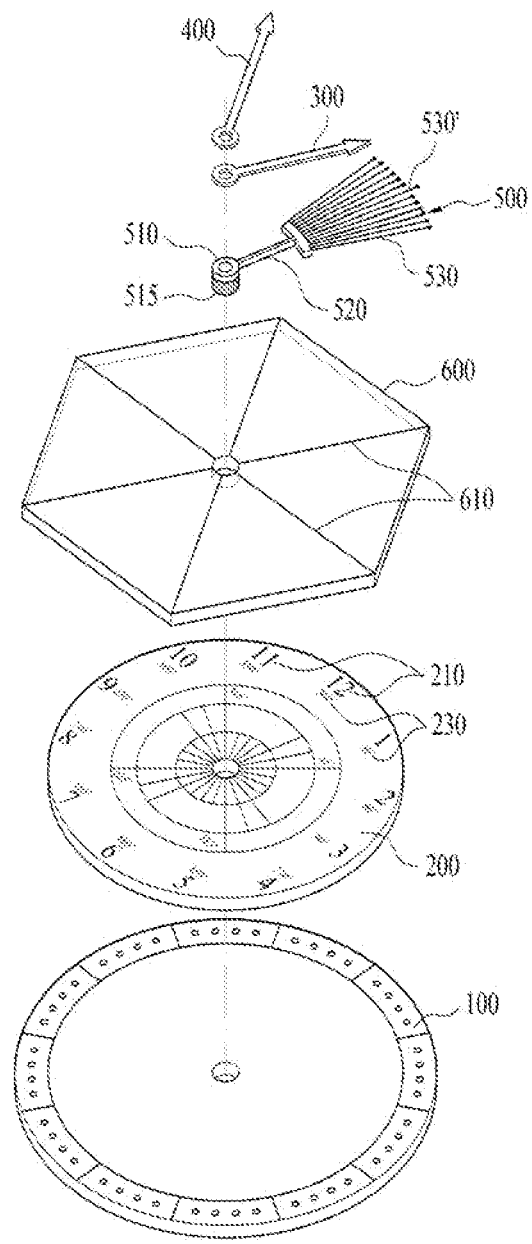
FIG. 6 is an exploded perspective view of the educational timepiece of FIG. 5.

The angle hand 500 having the above-described function will be described in detail. Referring to FIG. 6, the angle hand 500 includes a central part 510, a plurality of unit parts 530 radially extending from the central part 510, and a connection part 520 connecting the central part 510 to the plurality of unit parts 530.

The central part 510 may serve as a rotational center of the angle hand 500. The central part 510 may be connected to a second motor 60 that will be described later to rotate. Also, the plurality of unit parts 530 may radially extend from the central part 510, and an angle between the unit parts 530 may be equally divided into given angles. Thus, a user may count the number of unit parts 530 to measure the angle between the hour hand 300 and the hour indication part 210 adjacent to the hour hand 300. In detail, since the angle (hereinafter, referred to as a "unit angle") between the two units 530 adjacent to each other is regular, the angle between the hour hand 300 and the hour indication part 210 adjacent to the hour hand 300 may be measured by counting the number of unit angles.

In the present embodiment, thirteen unit parts 530 may be provided as an example. That is, since the thirteen unit parts 530 are spread at a regular angle to form a total angle of 30°. Thus, an angle between the unit parts adjacent to each other may be defined as a unit angle of 2.5°. Also, in the present embodiment, a unit part 530' that is a middle portion of the plurality of unit parts 530 disposed on the angle hand 500 may have a relative long length. This is done for easily counting the unit angles according to a position of the hour hand 300.

However, the present invention is not limited to the thirteen unit parts 530. For example, total seven unit parts 530 may be provided, and thus, an angle between the unit parts 530 adjacent to each other may be defined as an angle of 5°. That is, the present invention is not limited to the number of unit parts 530.

Referring to FIG. 1, since the hour hand 300 is disposed between 12:00 and 1:00, an angle from 12:00 that is relatively adjacent to the minute hand 400 to the hour hand may be measured. Here, the angle may be measured by using the unit angles. In more detail, the number of unit angles between 12:00 and a point that is indicated by the hour hand 300 may be counted. Here, total eleven unit angles may exist between 12:00 and the hour hand 300. Since each of the unit angles is defined as an angle of 2.5° in the present embodiment, an angle between 11:00 and the hour hand 300 may be defined as an angle of 27.5° (2.5°*11). Hereinafter, a method for calculating an angle between the hour hand 300 and the minute hand 400 by using the above-described measuring method will be described.

The method for measuring the angle between the hour hand 300 and the minute hand 400 may be performed in the following order.

i) Computation Example 1 (FIG. 1)

(1) First, the user counts the number of hour indication parts 210 that indicate fixed hours between the minute hand 400 and the hour hand 300. As illustrated in FIG. 1, the hour indication parts 210 that indicate two fixed hours, i.e., 11:00 and 12:00 exist between the minute hand 400 and the hour hand 300 (first process).

(2) Next, the user calculates the angle defined by the hour indication parts 210 between the minute hand 400 and the hour hand 300 through the number of hour indication parts 210 (second process). As described above, since the two hour indication parts 210, i.e., 11:00 and 12:00 exist between the minute hand 400 and the hour hand 300, the angle defined by the hour indication parts 210 may be 30°.

(3) Also, the user calculates an angle between the hour hand 300 and the hour indication part 210 that is adjacent in a direction from the hour hand 300 toward the minute hand 400 (third process). Referring to FIG. 1, the user has to calculate the angle between the hour indication part 210 in the direction from the hour hand 300 to the minute hand 400, i.e., the hour indication part 210 that indicates 12:00 and the hour hand 300.

Here, the angle between the hour indication part 210 and the hour hand 300 may be calculated by using the angle hand 500. In more detail, the angle between the hour indication part 210 and the hour hand 300 may be calculated through the number of unit angles of the angle hand 500, which exist between the hour indication part 210 adjacent in the direction from the hour hand 300 to the minute hand 400, i.e., between the hour indication part 210 that indicates 12:00 and the hour hand 300. In FIG. 1, since the total eleven unit angles exist between the hour indication part 210 that indicates 12:00 and the hour hand 300, the angle may be 27.5°.

Figure 3:
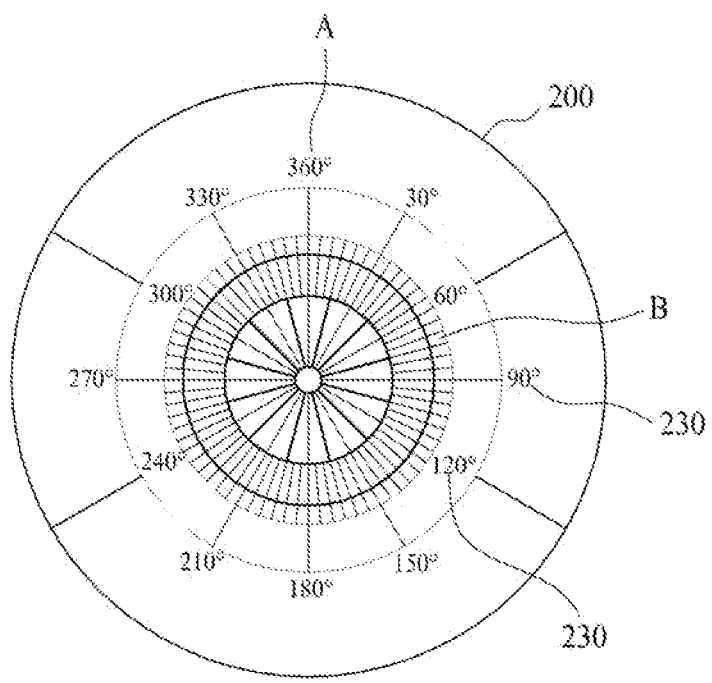
FIG. 3 is a plan view of an educational timepiece according to an embodiment of the present invention.

(4) Finally, the user calculates the angle between the hour hand 300 and the minute hand 400 by adding up the angles that are calculated in the second and third processes (fourth process). That is, the angle of 30° calculated in the second process and the angle of 27.5° calculated in the third process may add up to resultantly obtain an angle of 57.5°.

ii) Computation Example 2 (FIG. 3)

When the above-described processes are applied to FIG. 3 to calculate the angle between the hour hand 300 and the minute hand 400, the calculation process is as follows.

(1) First, hour indication parts 210 that indicate 4:00 to 8:00, i.e., total five hour indication parts 210 exist between the hour hand 300 and the minute hand 400. Thus, an angle between the hour hand 300 and the minute hand 400 may be) 120° (4*30°.

(2) Also, an angle between a position that is indicated by the hour hand 300 and the hour indication part 210 existing at a position adjacent to the minute hand 400, i.e., 4:00 may be calculated. As illustrated in FIG. 3, total four unit angles exist between the hour hand 300 and the hour indication part 210 that indicates 4:00. Thus, the angle between the hour hand 300 and the hour indication part 210 that indicates 4:00 may be 10° (4*2.5°).

(3) Thus, the angle between the hour hand 300 and the minute hand 400 may be 130° (120°±10°).

Referring to FIG. 6, a driven gear part 515 is disposed on the central part 510 of the angle hand 500. The driven gear part 515 is provided in a gear shape on the central part 510. The driven gear part 515 may be engaged with a second motor unit 60 that will be described below to allow the angle hand 50 to rotate.

Also, although not shown, gradations for indicating a length may be indicated on each of the hour hand 300, the minute hand 400, and the angle hand 500.

Constitutions of the system of the educational timepiece according to the present invention will be described with reference to FIGS. 4A and 4B.

Figure 4A:
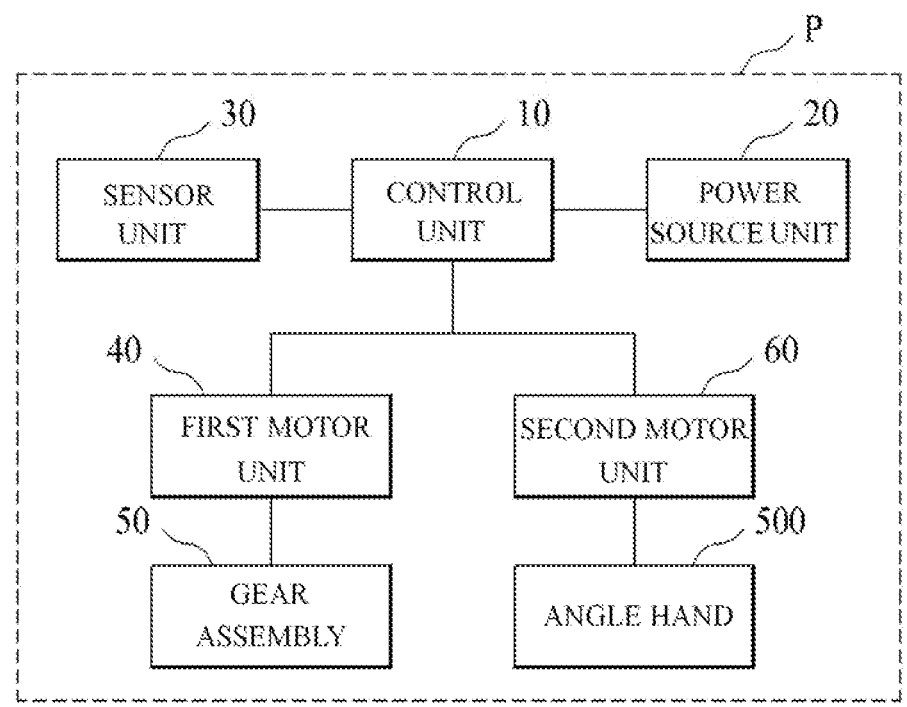
FIGS. 4A and 4B are view illustrating a system of the educational timepiece according to the present invention.

Referring to FIG. 4A, the educational timepiece according to the present invention includes a control unit 10. The control unit 10 may control the overall operation of the educational timepiece and be disposed the bottom surface of the base plate 100.

A power supplied from the power source unit 20 may be transmitted into a first motor unit 40 and the second motor unit 60 under the control of the control unit 10. Also, the control unit 10 may be connected to a sensor unit 30 to selectively drive the second motor unit 50 in response to a signal of the sensor unit 30.

The power source unit 20 may be connected to the control unit 10 to supply a power for rotating the hour part 300, the minute part 400, and the angle hand 500. In the present embodiment, the power source unit 20 may be provided as a replaceable battery to supply electrical energy.

The sensor unit 30 is connected to the control unit 10. The sensor unit 30 may detect a position of the hour hand 300. In more detail, when the hour hand 300 is disposed at the hour indication part 210 that indicates a fixed hour, the sensor unit 30 may detect the position of the hour hand 30. That is, when the hour hand 300 rotates to a position corresponding to the hour indication part 210 that indicates a fixed hour such as 1:00, 2:00, 3:00, . . . or, 12:00, the sensor unit 30 may detect the rotation of the hour hand 300 to transmit a signal to the control unit 10.

Each of the first and second motor units 40 and 60 is connected to the control unit 10. Also, the first motor unit may be connected again to a gear assembly 50. The gear assembly 50 may rotate the hour hand 300 and the minute hand 400. Here, the hour hand 300 may be adjusted by the gear assembly 50 so that the hour hand 300 rotates at an angle of 30° while the minute hand 400 rotates at an angle of 360°.

Also, the second motor unit 60 may rotate the angle hand 500. In more detail, the second motor unit 60 sequentially rotates the angle hand 500 by a predetermined angle. That is, when the hour hand 300 is disposed at the hour indication part 210 that indicates a fixed hour, the control unit 300 may detect the position of the hour hand 300. Then, the control unit 10 may drive the second motor part 60 to rotate the angle hand 500 so that the angle hand 500 is disposed between two hour indication parts 210 adjacent to the hour hand 300. For this, the angle hand 500 may rotate at an angle of 30° in a clockwise direction every hour on the hour. As illustrated in FIGS. 1 and 3, the angle hand 500 is disposed between the two hour indication parts 210 (between 12:00 and 1:00 in FIG. 1 and between 3:00 and 4:00 in FIG. 3) adjacent to the hour hand 300.

Figure 4B:
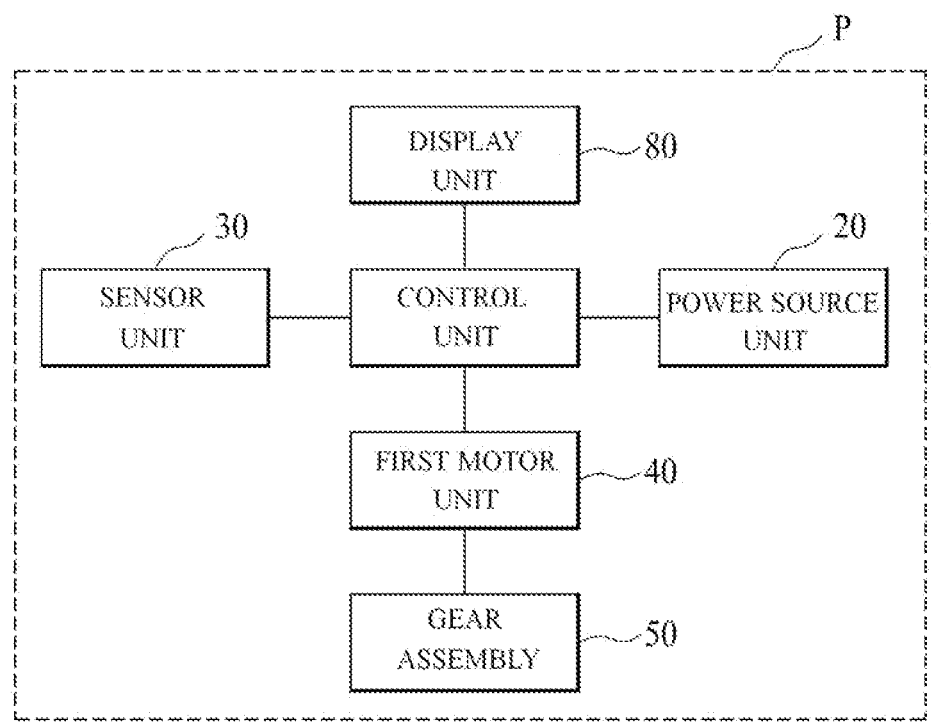

FIG. 4B illustrates another example of the system of the educational timepiece according to the present invention. Hereinafter, only components different from those of the embodiment illustrated in FIG. 4A will be described.

Referring to FIG. 4B, the control unit includes a display unit 80. The display unit 80 is disposed on the base plate 100 to digitalize the angle hand 500. That is, the angle hand 500 may not be indicated an angle while physically rotating, but be digitalized and then displayed on a screen.

In more detail, the display unit 80 may be disposed on the base plate 100 or the indication plate 200 to display the angle hand 500. The angle hand 500 may be displayed on a position that rotates by an angle of 30° whenever the hour hand 300 is disposed at the hour indication part 210 that indicates a fixed hour by the control of the sensor unit 30 and the control unit 10.

Hereinafter, an educational timepiece according to another embodiment of the present invention will be described in detail with reference to FIGS. 5 and 6. Hereinafter, only components different from those of the foregoing embodiment will be described, and thus, the same component will be omitted.

Figure 5:
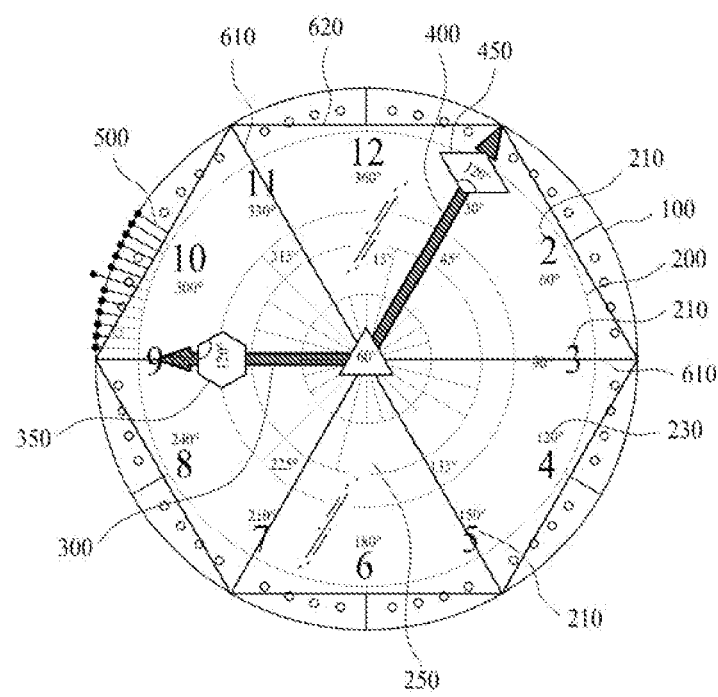
FIG. 5 is a plan view of an educational timepiece according to another embodiment of the present invention.

As illustrated in FIG. 5, an auxiliary plate 600 having a polygonal shape may be disposed on a base plate 100. The auxiliary plate 600 may have the polygonal shape. That is, various polygonal shapes may be displayed on an outer surface of the auxiliary plate 600. In the present embodiment, the auxiliary plate 600 having six regular triangles 610 inside six hexagonal shapes may be provided.

The auxiliary plate 600 may be configured to learn various angles by observing the various polygonal shapes from the educational timepiece. That is, various angles may be observed according to the rotations of the position-variable hour hand 300 and minute hand 400. For example, each of the total six regular triangles 610 disposed on the auxiliary plate 600 may have an internal angle of 60°. Here, since an angle between the two hour indication parts 210 that indicate fixed hours and are adjacent to each other is 30°, two vertexes of one regular triangle are disposed at positions corresponding to the two hour indication parts 210 that are spaced apart from each other by an angle of 60° as illustrated in FIG. 5.

Also, when the hour hand 300 and the minute hand 400 are disposed on a specific side of each of the regular triangles 610, the angle between the hour hand 300 and the minute hand 400 may be easily calculated. For example, as illustrated in FIG. 5, when the hour hand 300 is disposed at the hour indication part 210 that indicates 9:00, and the minute hand 400 is disposed at the hour indication part 210 that indicates 1:00, it may be intuitionally seen that an angle between the hour hand 300 and the minute hand 400 is 120°.

Also, the plurality of regular triangles 610 may be combined with each other to form various polygonal shapes such as a diamond shape, a trapezoid shape, a regular hexagonal shape, and the like, within one auxiliary plate 600 thereby realizing various educational functions.

Also, polygonal-shaped pieces 350 and 450 corresponding to the polygonal shapes of the auxiliary plate 600 may be disposed on at least one of the hour hand 300 and the minute hand 400. The polygonal-shaped pieces 350 and 450 may be separably coupled to the hour hand 300 or the minute hand 400. This is done for observing more various polygonal shapes from the educational timepiece, like the auxiliary plate 600.

For this, each of the polygonal-shaped pieces 350 and 450 may have the same shape as the polygonal shape displayed on the auxiliary plate 600 or have a polygonal shape having internal angles corresponding to the various internal angles defined by the auxiliary plate 600.

Figure 7:
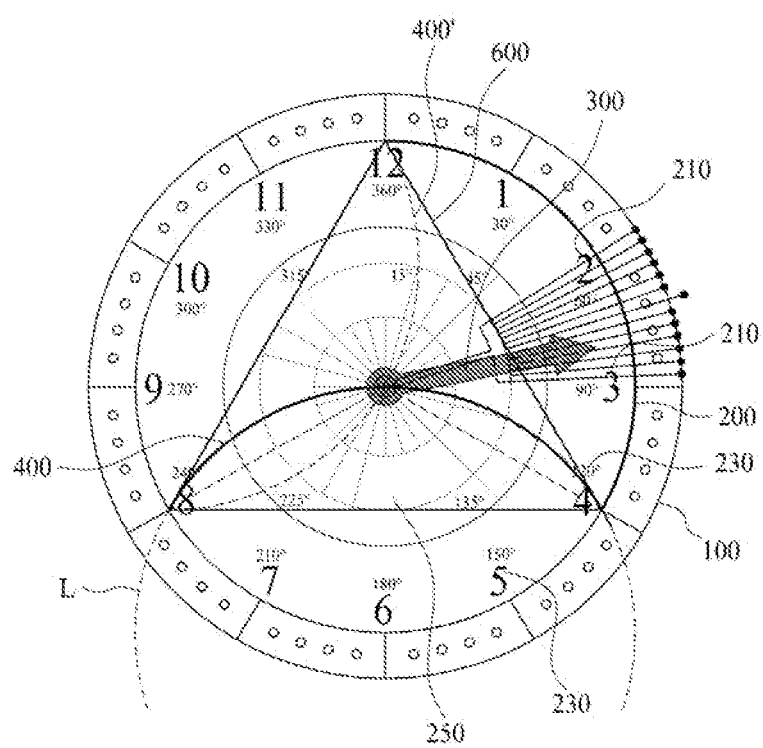
FIG. 7 is a plan view of an educational timepiece according to a further another embodiment of the present invention.

Hereinafter, an educational timepiece according to another embodiment of the present invention will be described in detail with reference to FIG. 7. Hereinafter, only components different from those of the foregoing embodiment will be described, and thus, the same component will be omitted.

In the present embodiment, an auxiliary plate 600 is disposed on a base plate 100. Like the forgoing embodiment illustrated in FIG. 5, the auxiliary plate has a polygonal shape. The auxiliary plate 600 may be configured to learn various angles by observing various polygonal shapes from the educational timepiece. In the current embodiment, the auxiliary plate 600 has a regular triangular shape.

A minute hand 400 has a circular arc shape. In more detail, the minute hand 400 may have a circular arc shape that passes through adjacent two vertexes of the regular triangular shape of the auxiliary plate 600 and a rotational center of the minute hand 400. Here, the minute hand 400 may define a portion of a virtual circle L, i.e., a circular arc having a radius that corresponds to a line connecting the rotational center of the minute hand 400 to an end of the minute hand 400.

The minute hand 400 may rotate to allow both ends thereof to contact adjacent two vertexes of three vertexes of the triangular shape. In more detail, both ends of the minute hand 400 may successively contact the two vertexes of the three vertexes of the triangular shape at an interval of about 20 minutes. FIG. 7 illustrates a state in which both ends of the minute hand 400 contact the two vertexes, which are disposed at relatively low sides, of the three vertexes of the triangular shape. The user may confirm that the triangular shape corresponds to a regular triangular shape through the rotation of the minute hand 400.

The present invention is not limited to the above-described embodiments and is defined by the appended claims, and also it will be apparent to those skilled in the art that various modifications and variations can be made in the present invention without departing form the spirit or scope of the invention.

Although the plurality of unit parts 540 of the angle hand 500 are radially formed at an angle of 30° and disposed between the hour indication parts 210 that indicate two fixed hours and are adjacent to each other in the foregoing embodiments, the present invention is not limited thereto. For example, the plurality of unit parts 530 may be disposed at various angles such angles of 60° and 90°.

INDUSTRIAL APPLICABILITY

The present invention relates to the educational timepiece including the hour hand and the minute hand to visually indicate the hours. The present invention may enables students to easily calculate the angle between the hour hand and the minute hand, thereby promising the educational effect using the timepiece in addition to the original function of the timepiece.

The invention claimed is:

1. An educational timepiece comprising: an hour hand; a minute hand; a base plate on which the hour hand and the minute hand rotate along a top surface thereof; hour indication parts including hour markers formed on the top surface of the base plate; and an angle hand configured to rotate at once along the top surface of the base plate at an angle of 30° with respect to the hour hand whenever the hour hand indicates one of the hour markers at a time an hour begins, and maintaining a position of the angle hand between two hour markers adjacent to the hour hand for an hour while the hour hand continues to rotate until the hour hand aligns with the next hour marker indicating the beginning of the next hour, wherein the angle hand is divided into predetermined angle units between the two hour markers, wherein the angle hand comprises a central part and a plurality of equally spaced unit parts radially extending from the central part, the plurality of unit parts having a predetermined angle therebetween which divide an angle of 30° between the two hour markers into a plurality of equal segments with respect to central centers of the hour hand and minute hand to indicate specific angles.

2. The educational timepiece of claim 1, wherein angle indication parts corresponding to the hour indication parts that respectively indicate the hour markers are disposed on the top surface of the base plate, and the angle indication parts divide the base plate into 360 equal segments at an angle of 360° with respect to central centers of the hour hand and the minute hand to indicate respective angles.

3. The educational timepiece of claim 2, wherein the angle indication parts comprises:
   a first angle indication part increasing in angle of the hour indication parts from an hour marker that indicates 12:00 corresponding to 0° in a clockwise direction; and
   a second angle indication part increasing in angle of the hour indication parts from the hour marker that indicates 12:00 corresponding to 0° in a counterclockwise direction.

4. The educational timepiece of claim 3, wherein an auxiliary plate having a polygonal shape is coupled to the top surface of the base plate to observe an angle between the hour indication parts or an internal angle between the angle indication parts.

5. The educational timepiece of claim 4, wherein the auxiliary plate has a regular polygonal shape, and the minute hand has a circular arc shape that passes through adjacent two vertexes of the regular polygonal shape and the rotational center of the minute hand.

6. The educational timepiece of claim 5, wherein a polygonal-shaped piece corresponding to the polygonal shape of the auxiliary plate is disposed on at least one of the hour hand and the minute hand.

7. The educational timepiece of claim 1, wherein a central unit part of the plurality of unit parts disposed on the angle hand has a relatively long length.

8. The educational timepiece of claim 7, wherein the educational timepiece comprises:
   a control unit disposed on a bottom surface of the base plate;
   a power source unit connected to the control unit to supply a power into the educational timepiece;
   a first motor unit and gear assembly which are connected to the control unit to rotate the hour hand and the minute hand by using the power supplied from the power source unit; and
   a second motor unit connected to the control unit to rotate the angle hand by using the power supplied from the power source unit.

9. The educational timepiece of claim 8, wherein a driven gear part connected to the second motor unit is disposed at a central portion of the angle hand, and the control unit comprises a sensor unit to rotate the angle hand when the hour hand indicates one of the hour markers at a time an hour begins.

10. The educational timepiece of claim 1, further comprising:
    a control unit disposed on a bottom surface of the base plate;
    a power source unit connected to the control unit to supply a power into the educational timepiece;
    a first motor unit and gear assembly which are connected to the control unit to rotate the hour hand and the minute hand by using the power supplied from the power source unit; and
    a display unit connected to the control unit to display the angle hand on the base plate.

* * * * *